US006811273B2

(12) United States Patent
Satoh et al.

(10) Patent No.: US 6,811,273 B2
(45) Date of Patent: Nov. 2, 2004

(54) ILLUMINATION UNIT FOR REELS OF SLOT MACHINE

(75) Inventors: Masatoshi Satoh, Tokyo (JP); Misao Yamanaka, Tokyo (JP); Masanori Suganuma, Tokyo (JP)

(73) Assignee: Konami Corporation, Tokyo (JP)

( * ) Notice: Subject to any disclaimer, the term of this patent is extended or adjusted under 35 U.S.C. 154(b) by 22 days.

(21) Appl. No.: 10/254,660

(22) Filed: Sep. 26, 2002

(65) Prior Publication Data

US 2004/0062025 A1 Apr. 1, 2004

(51) Int. Cl.[7] .................................................. G01D 11/28

(52) U.S. Cl. ........................... 362/27; 362/231; 362/31; 463/31

(58) Field of Search .............................. 362/27, 31, 26, 362/559, 552, 89, 234, 253, 800, 458, 295, 237, 231; 385/50; 463/30, 31, 32, 33, 34; 40/546; 273/143 R

(56) References Cited

U.S. PATENT DOCUMENTS

2003/0064799 A1 * 4/2003 Goins et al. .................. 463/30

* cited by examiner

*Primary Examiner*—Thomas M. Sember
*Assistant Examiner*—Bao Q. Truong
(74) *Attorney, Agent, or Firm*—Sughrue Mion, PLLC

(57) ABSTRACT

At least one transparent plate member has a first main surface facing to the inside of a gaming machine, a second main surface facing to the outside of the gaming machine, and side surfaces connecting the first main surface and the second main surface. At least one illuminator emits a colored light beam, so as to be incident on at least one of the side surfaces. At least one light director is provided in the plate member to direct the incident colored light beam toward the outside of the gaming machine.

19 Claims, 8 Drawing Sheets

ILLUMINATION UNIT FOR REELS OF SLOT MACHINE

BACKGROUND OF THE INVENTION

This invention relates to a unit for illuminating the peripheral surface and surrounding portion of each reel in a slot machine wherein when a plurality of reels each with a plurality of symbols provided on the peripheral surface are stopped, if a specific combination of the symbols on the reels holds on a validated pay line, the game state changes (a transition is made to a bonus game, for example).

A reel-type slot machine is known as a gaming machine installed in a casino, etc. Such a slot machine is provided in the front center of the machine with a display window for displaying the symbols provided on the peripheral surfaces of the reels, and also comprises a coin slot, a start lever, etc., disposed at appropriate positions of the machine front. As shown in FIG. 13, a plurality of reels 1 and a backlight illumination unit 2 for illuminating the peripheral surface of each reel 1 are placed inside the display window.

The illumination unit 2 has a light source 3 such as a fluorescent lamp or an electric light bulb and a frame member 4 placed in front of the light source 3. The frame member 4 is made of a colorless or color-tinted transparent plate of acrylic, etc., and a front face 4*a* is made translucent like frosted glass so that light from the light source 3, incident from a rear face 4*b* is emitted while it is scattered. When power is turned on, the illumination unit 2 illuminates the peripheral surfaces of the reels, making the symbols on the reels easy to see from the outside through the display window during the game.

In this kind of slot machine, when a coin is input and the start lever is operated, all reels start to rotate all at once and then stop. When all reels stop, if the symbols on the reels stopped on at least one validated pay line of a plurality of pay lines become a predetermined combination, a predetermined number of coins are paid out as an award. When a winning is thus determined, the illumination unit 2 performs predetermined lighting, blinking operation for illuminating the peripheral surfaces and surrounding portions of the reels to enhance the stage effects.

In recent slot machines, it has been common practice to adopt a system wherein to give the opportunity for the player to get a large amount of award, when a specific combination of the symbols on the reels holds on the validated pay line, the player wins a special prize and is allowed to make a transition from the normal game to plural turns of bonus games. In the configuration in which the game situation thus changes, the illumination at the normal game time and that at the bonus game time are changed appropriately and further specific illumination is conducted at the game state transition time, whereby the stage effects can be more enhanced.

However, as shown in FIG. 14, in the configuration in which the light source 3 is placed in the rear side of the transparent frame member 4, lighting, blinking, or flashing operation is performed, and illumination light is allowed to pass through the front face 4*a* from the rear face 4*b* of the frame member 4, the illumination content types are poor and sufficient stage effects cannot be provided. To supply diverse types of illumination in response to the changing game state, measures for increasing the types and the number of light source or the like become necessary and an increase in cost cannot be avoided.

SUMMARY OF THE INVENTION

It is therefore an object of the invention to provide an illumination unit for reels of a slot machine for changing the colors of the peripheral surface of each reel as a symbol display section and its surroundings in various manners for improving the stage effects.

In order to achieve the above object, according to the present invention, there is provided an illumination device, comprising.

at least one transparent plate member, having a first main surface facing to the inside of a gaming machine, a second main surface facing to the outside of the gaming machine, and side surfaces connecting the first main surface and the second main surface;

at least one illuminator, which emits a colored light beam, so as to be incident on at least one of the side surfaces;

at least one light director, provided in the plate member to direct the incident colored light beam toward the outside of the gaming machine.

Preferably, a plurality of light directors are provided in each transparent plate member.

Here, it is preferable that a plurality of illuminators are provided such that each illuminator is associated with one of the light directors.

Preferably, a plurality of transparent plate members are provided.

Here, it is preferable that a plurality of illuminators are provided such that each illuminator is associated with one of the transparent plate members.

Preferably, the transparent plate member is formed with a through hole such that a size of a first aperture at the first main surface is smaller than a size of a second aperture at the second main surface. At least one of inner surfaces defined by the through hole connecting the first aperture and the second aperture serves as the light director.

Here, it is preferable that a cross sectional shape of the inner face defined by the through hole is rounded.

Preferably, a groove is formed on at least one of the first main surface and the second main surface so that a surface defined by the groove serves as the light director.

Preferably, a plurality of transparent plate members are laminated in a direction perpendicular to the first main surface and the second main surface. At least one light beam emitted from the illuminator is incident on at least one of the side faces of each transparent plate member.

Here, it is preferable that the transparent plate members are laminated such that the respective light directors are superposed with each other.

Preferably, the transparent plate member is an acryl plate.

Preferably, the illuminator includes a red light source, a green light source, a blue light source, and a light adjuster which adjusts each intensity of the red light source, the green light source and the blue light source to emit the colored light.

In the above configurations, the colorful illumination stage effects for the reels of the slot machine can be provided by a very inexpensive configuration.

According to the present invention, there is also provided a gaming machine, comprising:

an illuminated object provided inside of the gaming machine;

a transparent plate member, having a first main surface facing to the inside of the gaming machine, a second main surface facing to the outside of the gaming machine, and side surfaces connecting the first main surface and the second main surface;

an illuminator, which emits a colored light beam, so as to be incident on at least one of the side surfaces;

a light director, provided in the plate member to direct the incident colored light beam toward the outside of the gaming machine; and a controller, which controls an intensity of the colored light beam emitted from the illuminator, in accordance with a situation of a game performed.

Preferably, the illuminated object is a reel of a slot machine.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Preferred embodiments of the invention will be described with reference to the accompanying drawings.

Figure 1:
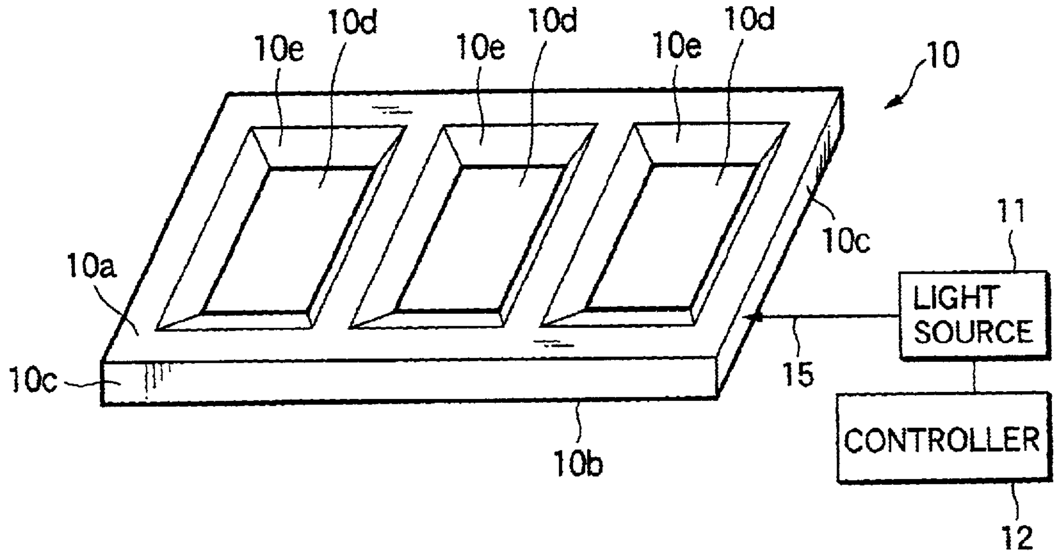
FIG. 1 is a schematic perspective view to show an illumination unit according to a first embodiment of the invention.

FIG. 1 shows an illumination unit according to a first embodiment of the invention. The illumination unit has a transparent frame member 10 placed in the rear side of a symbol display window (not shown) of a slot machine and in front of a plurality of reels 14 each with a plurality of symbols provided on the peripheral surface.

The transparent frame member 10 has a front face 10*a* and a rear face 10*b* as main faces and side end faces 10*c* connecting them. It is formed with through holes 10*d* as many as the number of the reels so as to penetrate the frame member 10 from the front face 10*a* to the rear face 10*b*. The through holes 10*d* are positioned in the front side of the reels 14, as shown in FIG. 2.

Figure 2:
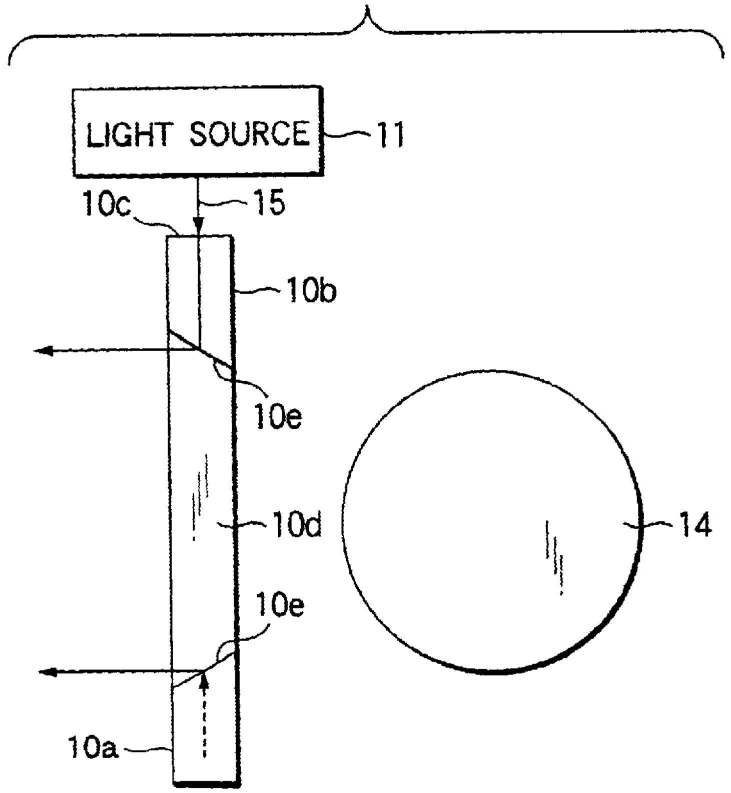
FIG. 2 is a schematic sectional view of the illumination unit shown in FIG. 1.

The size of a front face 10*a* side opening of each through hole 10*d* is formed larger than that of a rear face 10*b* side opening, whereby an inner end face 10*e* of each through hole 10*d* connecting both the openings is a slope widening toward the front face 10*a*, as shown in FIGS. 1 and 2. The surface of each inner end face 10*e* is a light scatter face like frosted glass.

Light 15 emitted from a light source 11 is incident on the side end faces 10*e* of the transparent frame member 10 and propagates inside the frame member 10. At this time, each end face 10*e* formed as the light scatter face behaves as an exit of the propagating light (light director). A part of the incidence light 15 goes directly toward the light director 10*e* as indicated by the solid line in FIG. 2 and another part goes toward the light director 10*e* while it is totally reflected on the inner face of the frame member, as indicated by the dashed line in FIG. 2. The player situated in front of the display window visually recognizes only the emitted light from the light directors 10*e* and sees as each reel is surrounded by a light frame.

The inclination angle of the light director 10*e* can be set appropriately in the range in which it can guide the incidence light 15 to the outside of the display window.

As the light source 11, various known light sources of a LED, a fluorescent lamp, etc., can be adopted. The light source 11 may be a single-color light source for emitting a predetermined color (or a combination of a white color source and a filter for providing a predetermined color), but preferably an RGB light source unit that can emit red light, green light, and blue right at the same time and enables the emitted light strength to be adjusted appropriately. The light amount ratio of red, green, and blue of the primary colors of light is set appropriately, whereby light of any desired color can be provided For example, a light condenser for condensing emitted light of each color and making the light incident on the side end face 10*c* of the frame member 10 can be combined with a light source unit having LEDs or fluorescent lamps of the primary colors.

When each color light incident from the side end face 10*c* propagates inside the frame member 10 and is emitted from the light director 10*e*, the colors can be mixed by the effect of the light scatter faces to provide any desired color.

A controller 12 controls the color of light emitted from the light source 11 and the operation of lighting, blinking, flashing, etc., in response to the situation of game activation, normal gaming, transition to a bonus game, etc. For example, at the transition time to a bonus game, the light amount ratio of red, green, and blue making up the light illuminating the surroundings of the reels at the normal game time is changed to another light amount ratio for changing the color and way of illumination is performed, whereby the stage effects responsive to the situation change of the game can be produced.

Thus, according to the embodiment, the colorful illumination stage effects for the reels of the slot machine can be provided by a very inexpensive configuration.

Figure 3:
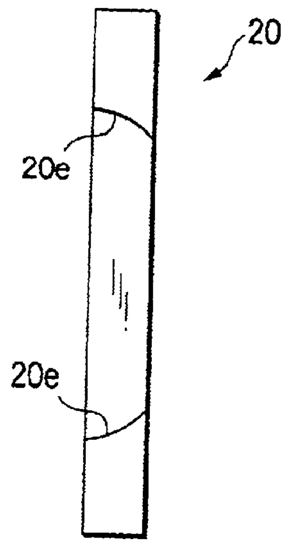
FIG. 3 is a schematic sectional view to show an illumination unit according to a second embodiment of the invention.

A second embodiment of the invention is shown in FIG. 3. In the first embodiment, the inner end face 10*e* of the through hole 10*d* forming the light director is a slope having a straight cross-sectional shape. However, in a frame member 20 in the second embodiment, a slope 20*e* having a curved cross-sectional shape is adopted as the inner end face

10*e*. The curvature radius of the cross section can be set appropriately in the range in which it can direct incidence light from a light source to the outside of a display window. According to the configuration, if a comparatively inexpensive light source is used, uniform illumination can also be provided.

Figure 4:
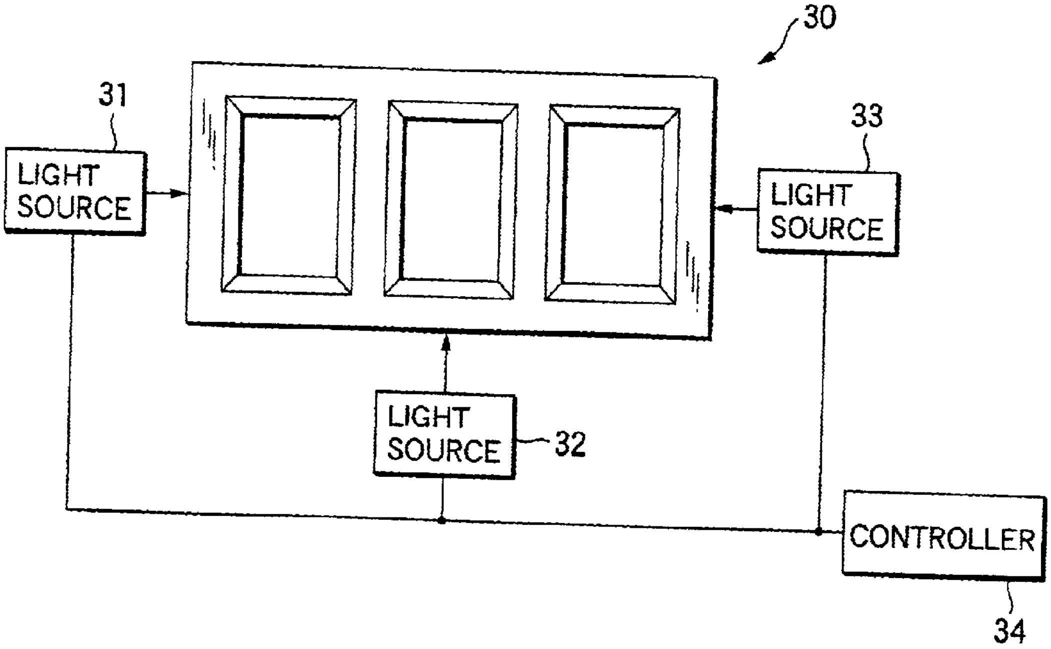
FIG. 4 is a schematic plan view to show an illumination unit according to a third embodiment of the invention.

A third embodiment of the invention is shown in FIG. 4. In the embodiment, a plurality of light sources 31, 32, and 33 are provided for a single frame member 30 and are totally controlled by a controller 34. The light sources 31, 32, and 33 may be implemented as a plurality of single-color light sources or a plurality of RGB light source units.

The principle and the configuration to provide illumination for the surrounding portions of reels are the same as those previously described with reference to FIGS. 1 and 2 in the first embodiment and therefore will not be discussed again in detail. The controller 34 operates at least one light source in response to the game state. For example, if each light source is implemented as a single-color light source, colors of light from the plurality of light sources are mixed in the frame member 30, so that the colorful illumination stage effects responsive to the game state can be provided. Since the controller 34 only switches the light sources to be operated, a simpler configuration can be adopted.

Of course, the light sources 31, 32, and 33 may be implemented as RGB light source units and the controller 34 may be made to appropriately set the RGB light amount ratio responsive to the game state. In this configuration, more colorful illumination stage effects can be provided.

The configuration in the embodiment can be applied to the frame member 20 in the second embodiment previously described with reference to FIG. 3.

Figure 5:
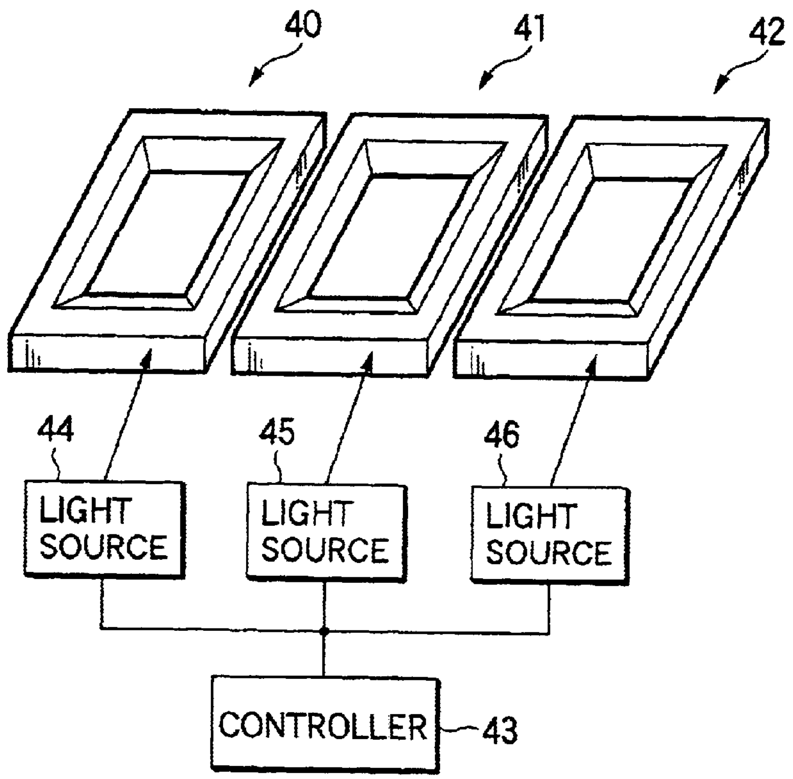
FIG. 5 is a schematic perspective view to show an illumination unit according to a fourth embodiment of the invention.

A fourth embodiment of the invention is shown in FIG. 5. In the embodiment, frame members 40, 41, and 42 are provided in a one-to-one correspondence with a plurality of reels of a slot machine. The configuration of through holes made in the frame members is the same as that previously described with reference to FIGS. 1 and 2 in the first embodiment and therefore will not be discussed again. The shape of the through hole previously described with reference to FIG. 3 in the second embodiment can be applied.

Light sources 44, 45, and 46 are provided in a one-to-one correspondence with the frame members 40, 41, and 42. The configuration of the light source is the same as that in the above-described embodiment and therefore will not be discussed again. A controller 43 can totally control the operation of each light source and the color of emitted light in response to the game state. In the fourth embodiment, the frame members 40, 41, and 42 are spaced from each other as separate members. However, for example, an opaque spacer can also be inserted between the frame members without placing the space therebetween.

According to the configuration, the illumination color and state of the surrounding portion of each reel can be changed for each reel, and more colorful illumination stage effects than those in the above-described embodiment can be provided.

Figure 6:
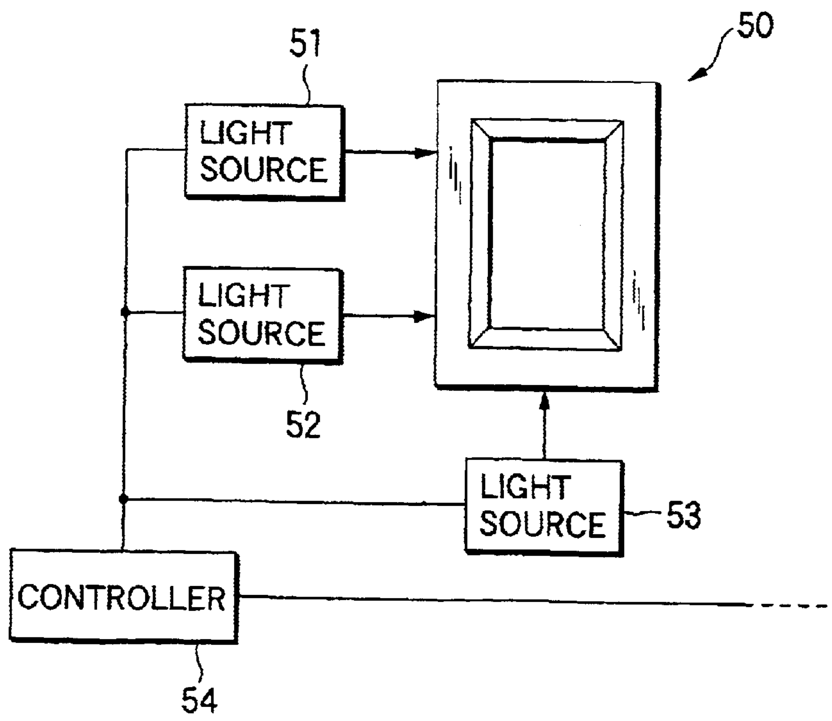
FIG. 6 is a schematic plan view to show an illumination unit according to a fifth embodiment of the invention.

A fifth embodiment of the invention is shown in FIG. 6. In the fourth embodiment, the light sources are provided in a one-to-one correspondence with the frame members provided in a one-to-one correspondence with the reels. However, as in the fifth embodiment, a plurality of light sources 51, 52, and 53 may be provided for each frame member 50 and may be totally controlled by a controller 54. The operation principle is substantially the same as that previously described with reference to FIG. 4 in the third embodiment and therefore will not be discussed again.

In the above-described embodiment, through holes penetrating the frame member from the front face to the rear face are made and the end face forming a part of the through hole is uses as the light director. However, the light director can be provided without making the through hole as in a sixth embodiment of the invention shown in FIGS. 7 and 8.

Figure 8:
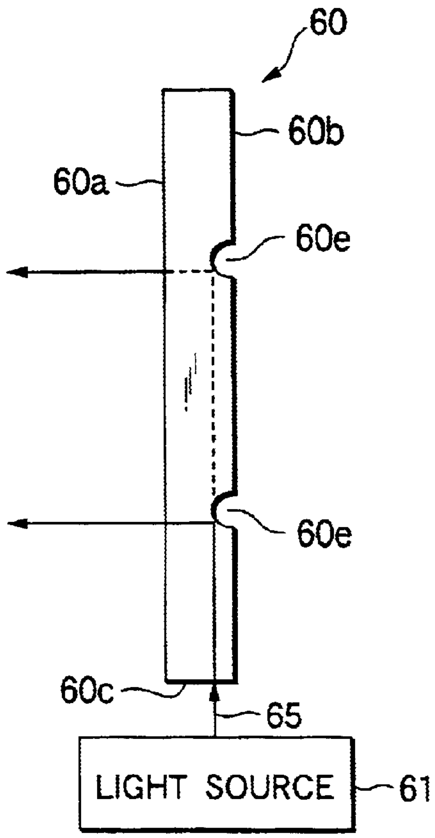
FIG. 8 is a schematic sectional views of the illumination unit shown in FIG. 7.

In the sixth embodiment, a frame member 60 is formed on a rear face 60*b* with a groove 60*e* of a predetermined depth matching the shape of the surrounding portion of a reel. Light 65 from a light source 61, incident on a side end face 60*c* is reflected on the bottom of the groove 60*e* serving as a light scatter face, as shown in FIG. 8, is emitted from a front face 60*a*, and is visually recognized by the player positioned in front of a display window. The player sees as each reel is surrounded by a light frame.

The cross-sectional shape of the groove 60*e* can be set appropriately in the range so as to direct the incidence light 65 to the outside of the display window.

In the embodiment, the groove 60*e* as the light director is formed so that one reel corresponds to one frame member 60. However, as shown in FIGS. 1 and 4 in the first embodiment and the third embodiment, one frame member may be formed with a plurality of light directors so as to correspond to a plurality of reels.

In the sixth embodiment, one light source corresponds to one frame member. However, as shown in FIGS. 4 and 6 in the third embodiment and the fifth embodiment, a plurality of light sources may be provided for a single frame member.

Figure 9:
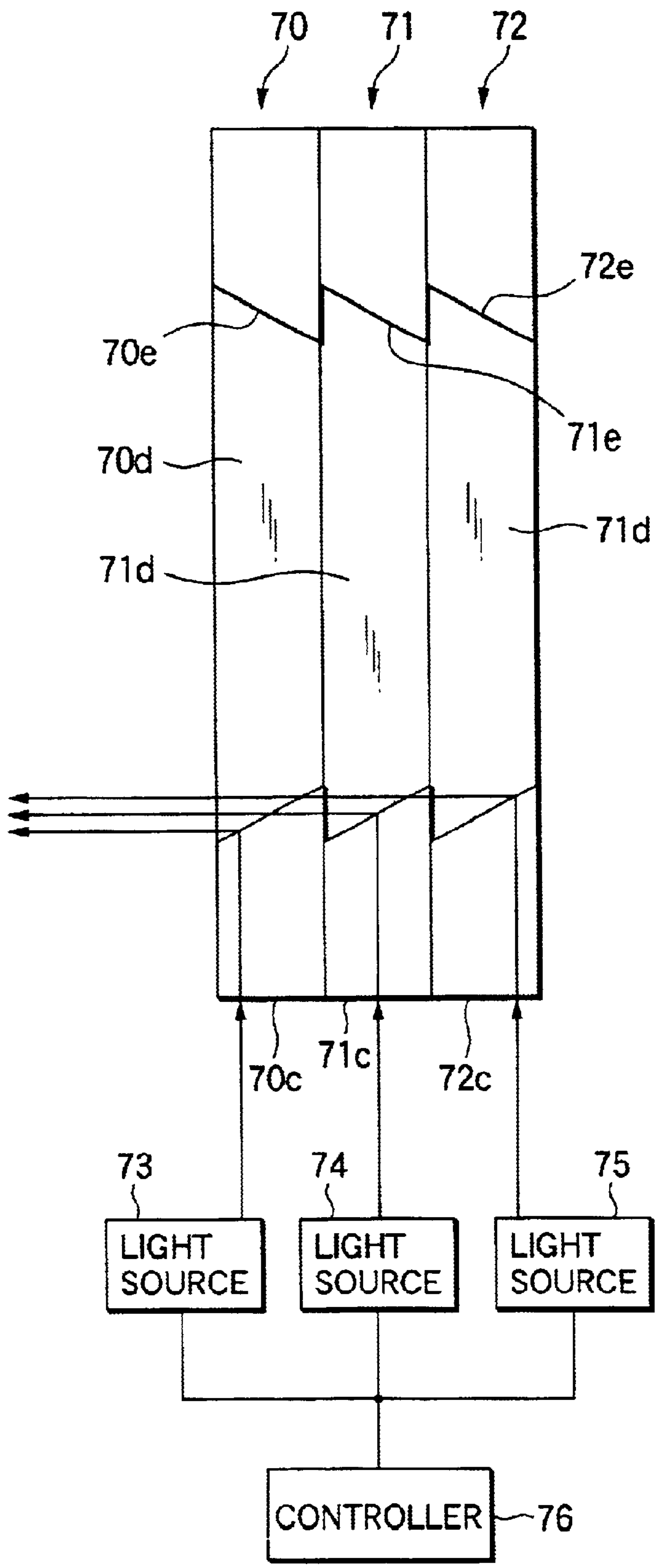
FIG. 9 is a schematic sectional view to show an illumination unit according to a seventh embodiment of the invention.

A seventh embodiment of the invention is shown in FIG. 9. In the embodiment, a first frame member 70 having a first through hole 70*d* formed with a first light director 70*e*, a second frame member 71 having a second through hole 71*d* formed with a second light director 71*e*, and a third frame member 72 having a third through hole 72*d* formed with a third light director 72*e* are laminated. The shape of each light director is the same as that previously described with reference to FIGS. 1 and 2 in the first embodiment and therefore will not be discussed again in detail.

Light sources 73, 74, and 75 are provided in a one-to-one correspondence with the frame members 70, 71, 72 and are totally controlled by a controller 76. Light from the light source 73, 74, 75, incident on an end face 70*c*, 71*c*, 72*c* of each frame member propagates inside each frame member, arrives at the light director 70*e*, 71*e*, 72*e*, and Is directed to the outside of a display window as emitted light. The player positioned in front of the display window sees as a light frame of the color provided by mixing the colors of the emitted light surrounds each reel.

The controller 76 changes the operation state of each light source and the color of the emitted light in response to the game state, whereby colorful illumination stage effects similar to those in the above-described embodiment can be provided.

Figure 7:
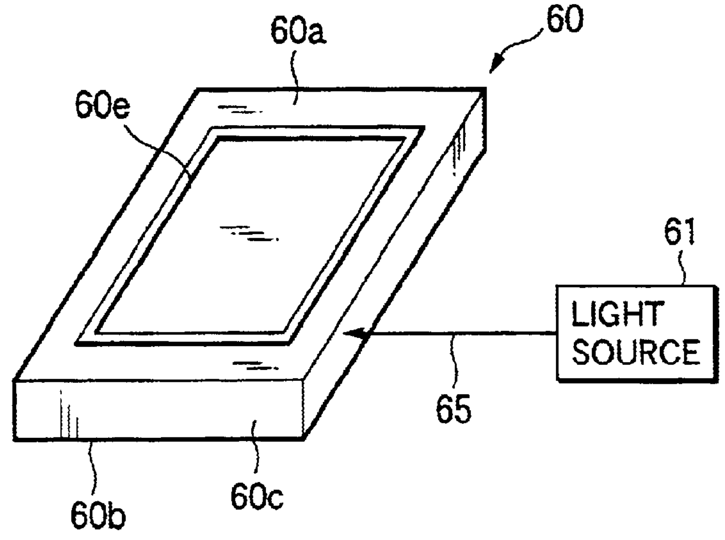
FIG. 7 is a schematic perspective view to show an illumination unit according to a sixth embodiment of the invention.

The shape of the light director can also be replaced with that previously described with reference to FIG. 3 in the second embodiment or FIG. 7 in the sixth embodiment.

Each frame member may be formed with through holes as many as the number of the reels, as previously described with reference to FIG. 1 in the first embodiment.

A plurality of light sources may be provided for each frame member as previously described with reference to FIG. 4 in the third embodiment.

Figure 10:
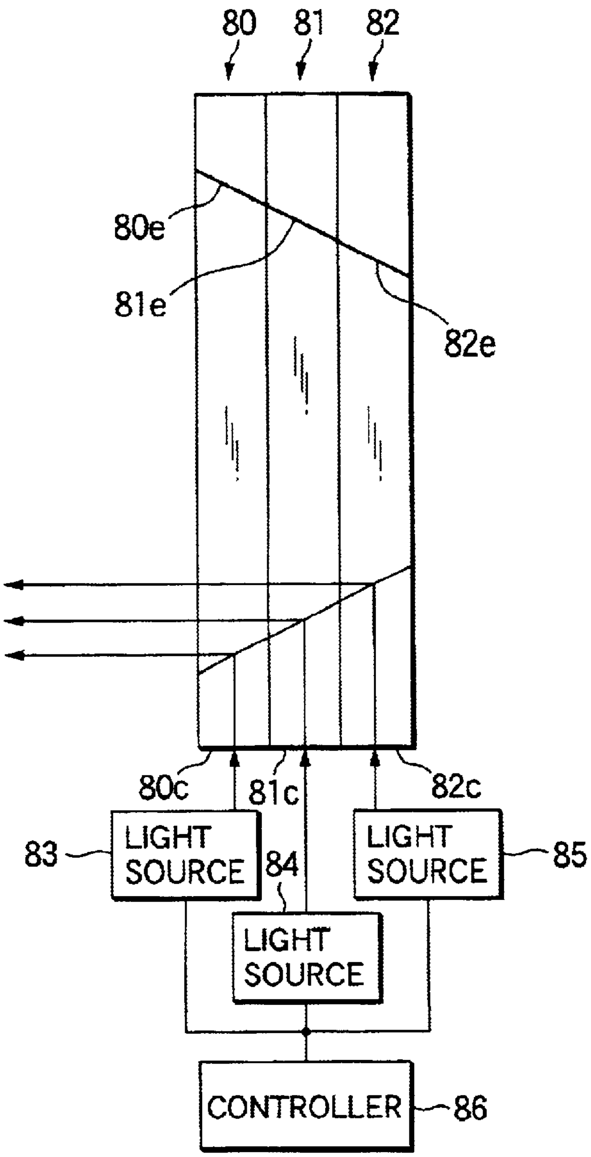
FIG. 10 is a schematic sectional view to show an illumination unit according to an eighth embodiment of the invention.
Figure 11:
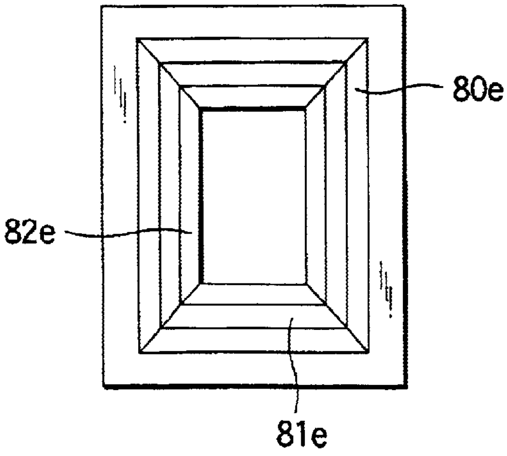
FIG. 11 is a schematic plan view of the illumination unit shown in FIG. 10.

An eighth embodiment of the invention is shown in FIGS. 10 and 11. The basic configuration in the embodiment is substantially the same as that previously described with reference to FIG. 9 in the seventh embodiment. The shapes and positions of light directors 80_e_, 81_e_, 82_e_ of frame members 80, 81, 82 are defined so that the light directors do not overlap each other in a plan view. Therefore, light incident on a side end face 80_c_, 81_c_, 82_c_ from a light source 83, 84, 85 and guided to the outside of a display window through the light director 80_e_, 81_e_, 82_e_ is visually recognized by the player as a light frame triply surrounding the reel.

A controller 86 changes the operation state of each light source and the color of the emitted light in response to the game state, whereby the number of illumination method options is further increased and more colorful illumination stage effects can be provided.

The shape of the light director can also be replaced with that previously described with reference to FIG. 3 in the second embodiment or FIG. 7 in the sixth embodiment.

Each frame member may be formed with through holes as many as the number of the reels, as previously described with reference to FIG. 1 in the first embodiment.

A plurality of light sources may be provided for each frame member as previously described with reference to FIG. 4 in the third embodiment.

Figure 12:
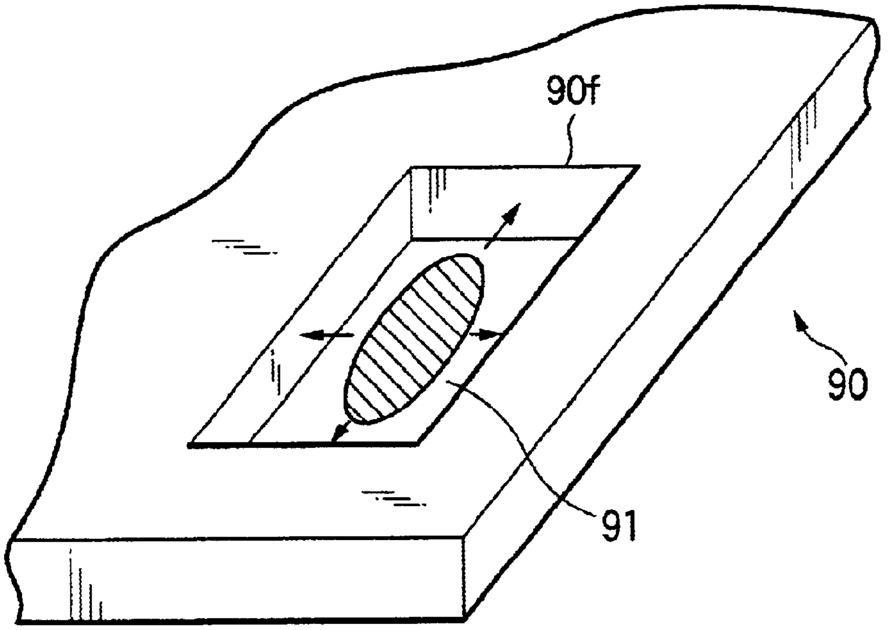
FIG. 12 is a schematic perspective view to show an illumination unit according to a ninth embodiment of the invention.
Figure 13:
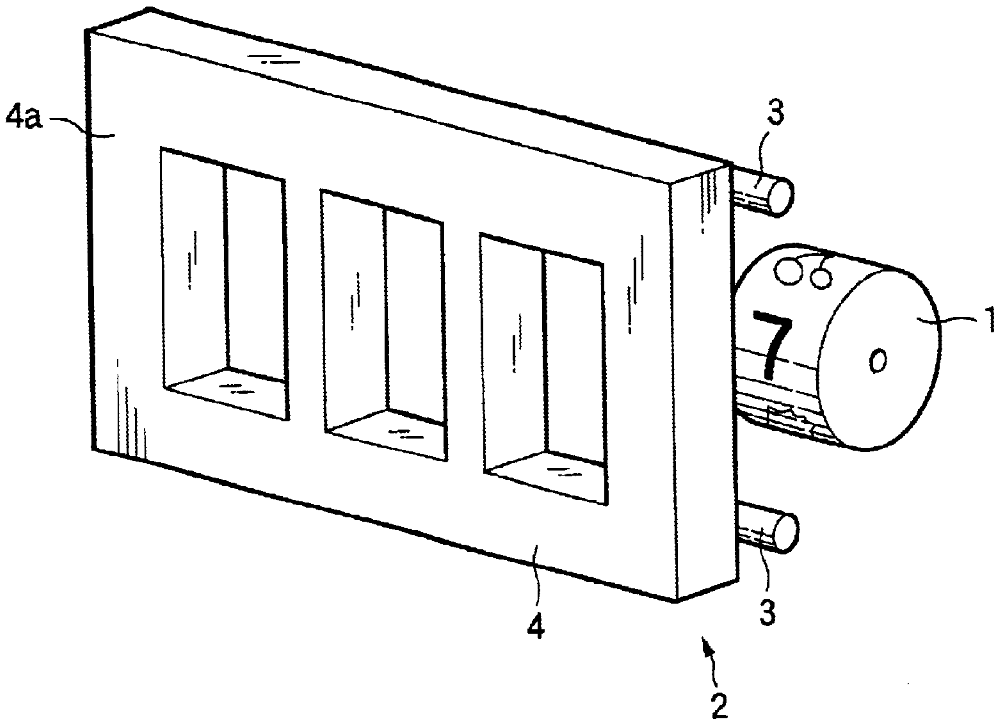
FIG. 13 is a schematic perspective view to show a reel illumination unit of a slot machine in a related art.
Figure 14:
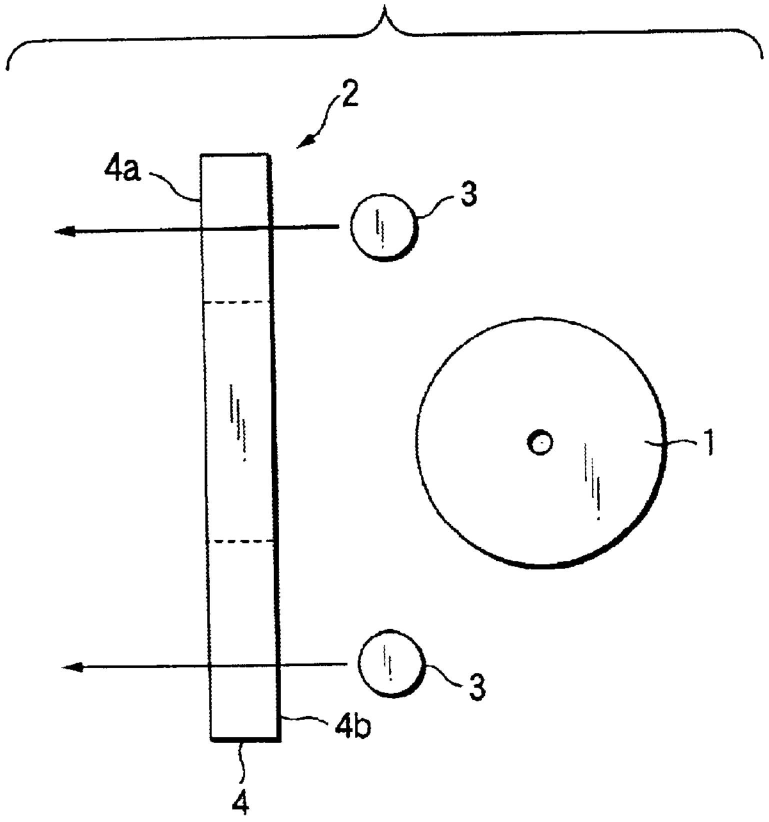
FIG. 14 is a schematic sectional view of the illumination unit shown in FIG. 13.

A ninth embodiment of the invention is shown in FIG. 12. In the above-described embodiment, the light emitted from the light source is made incident on the side end face of the transparent frame member. In the ninth embodiment, a through hole 90_f_ is made in a part of a frame member 90 and a light source 91 is placed in the through hole 90_f_. As the shapes, the number, placement, etc., of light directors, those shown in the above-described embodiments can be selected in combination appropriately. The invention is not limited to the mode wherein the light sources are provided in a one-to-one correspondence with the frame members.

The configuration can contribute to more miniaturization of the apparatus and space saving as compared with the case where the light source is placed outside the frame member. If the light source is covered appropriately with the frame of a display window, etc., so that the player does not visually recognize the light source itself, the player visually recognizes only the light frame surrounding each reel as in the above-described embodiments.

Although the preferred embodiments have been described, it is understood that the combination and arrangement of parts may be resorted to without departing from the spirit and the scope of the invention, needless to say. For example, the shape of the through hole (light director) of the transparent frame member is not limited to a rectangle as in the above-described embodiments and can be set appropriately in response to any desired stage effect method. The transparent fame member is not limited to an acrylic plate and the acrylic plate may be replaced with a glass plate.

What is claimed is:

1. An illumination device, comprising:

at least one transparent plate member, having a first main surface facing to the inside of a gaming machine, a second main surface facing to the outside of the gaming machine, and side surfaces connecting the first main surface and the second main surface;

at least one illuminator, which emits a colored light beam, so as to be incident on at least one of the side surfaces; and at least one light director, provided in the plate member to direct the incident colored light beam toward the outside of the gaming machine, wherein:

the transparent plate member is formed with a through hole such that a size of a first aperture at the first main surface is smaller than a size of a second aperture at the second main surface; and at least one of inner surfaces defined by the through hole connecting the first aperture and the second aperture serves as the light director.

2. The illumination device as set forth in claim 1, wherein a plurality of light directors are provided in each transparent plate member.

3. The illumination device as set forth in claim 2, wherein a plurality of illuminators are provided such that each illuminator is associated with one of the light directors.

4. The illumination device as set forth in claim 1, wherein a plurality of transparent plate members are provided.

5. The illumination device as set forth in claim 4, wherein a plurality of illuminators are provided such that each illuminator is associated with one of the transparent plate members.

6. The illumination device as set forth in claim 1, wherein a cross sectional shape of the inner face defined by the through hole is rounded.

7. The illumination device as set forth in claim 1, wherein:

a plurality of transparent plate members are laminated in a direction perpendicular to the first main surface and the second main surface; and at least one light beam emitted from the illuminator is incident on at least one of the side faces of each transparent plate member.

8. The illumination device as set forth in claim 7, wherein the transparent plate members are laminated such that the respective light directors are superposed with each other.

9. The illumination device as set forth in claim 1, wherein the illuminator includes a red light source, a green light source, a blue light source, and a light adjuster which adjusts each intensity of the red light source, the green light source and the blue light source to emit the colored light.

10. The illumination device as set forth in claim 1, wherein the light director scatters the incident colored light beam.

11. The illumination device as set forth in claim 1, wherein the transparent plate member is an acryl plate.

12. An illumination device, comprising:

at least one transparent plate member, having a first main surface to the inside of a gaming machine, a second main surface facing to the outside of the gaming machine, and side surfaces connecting the first main surface and the second main surface;

at least one illuminator, which emits a colored light beam, so as to be incident on at least one of the side surfaces;

at least one light director, provided in the plate member to direct the incident colored light beam toward the outside of the gaming machine while scattering;

wherein a groove is formed on at least one of the first main surface and the second main surface so that a surface defined by the groove serves as the light director.

13. A gaming machine, comprising:

an illuminated object provided inside of the gaming machine;

a transparent plate member, having a first main surface facing to the inside of the gaming machine, a second main surface facing to the outside of the gaming machine, and side surfaces connecting the first main surface and the second main surface;

an illuminator, which emits a colored light beam, so as to be incident on at least one of the side surfaces;

a light director, provided in the plate member to direct the incident colored light beam toward the outside of the gaming machine; and a controller, which controls an intensity of the colored light beam emitted from the illuminator, in accordance with a situation of a game performed wherein:

the transparent plate member is formed with a through hole such that a size of a first aperture at the first main surface is smaller than a size of a second aperture at the second main surface; and at least one of inner surfaces defined by the through hole connecting the first aperture and the second aperture serves as the light director.

14. The gaming machine as set forth in claim 13, wherein the illuminated object is a reel of a slot machine.

15. The gaming machine as set forth in claim 13, wherein the laminated structures each define a light director wherein the surface of the director is coplanar with that of the other directors or staggered.

16. The gaming machine as set forth in claim 13, wherein the laminated structures each define a light director wherein the surface of the director is coplanar with that of the other directors or staggered.

17. A gaming display device comprising:

a plurality of reels;

at least one transparent plate member, having a first main surface facing to the inside of a gaming machine, a second main surface facing to the outside of the gaming machine, and side surfaces connecting the first main surface and the second main surface;

at least one illuminator, which emits a colored light beam, so as to be incident on at least one of the side surfaces; and at least one light director, provided in the plate member to direct the incident colored light beam toward the outside of the gaming machine, wherein:

the at least one transparent plate member is formed with at least one through hole such that a size of a first aperture at the first main surface is smaller than a size of a second aperture at the second main surface; and at least one of inner surfaces defined by the through hole connecting the first aperture and the second aperture serves as the light director, and said reels are disposed in a position visible by a game player through said at least one through hole.

18. The gaming machine as set forth in claim 13, wherein the light director scatters the incident colored light beam.

19. A gaming machine, comprising:

an illuminated object provided inside of the gaming machine;

a transparent plate member, having a first main surface facing to the inside of the gaming machine, a second main surface to the outside of the gaming machine, and side surfaces connecting the first main surface and the second main surface;

an illuminator, which emits a colored light beam, so as to be incident on at least one of the side surfaces;

a light director, provided in the plate member to direct the incident colored light beam toward the outside of the gaming machine while scattering; and a controller which controls an intensity of the colored light beam emitted from the illuminator, in accordance with a situation of a game performed, wherein a groove is formed on at least one of the first main surface and the second main surface so that a surface defined by the groove serves as the light director.

* * * * *